United States Patent Office 2,895,797
Patented July 21, 1959

2,895,797
RECOVERY OF GERMANIUM TETRACHLORIDE

Cyril T. Hill, New York, N.Y., assignor to Texas Gulf Sulphur Company, New York, N.Y., a corporation of Texas No Drawing. Application February 14, 1955
Serial No. 488,159

5 Claims. (Cl. 23—87)

This invention relates to the recovery of germanium from sulfide-containing minerals, and specifically to the interaction of such minerals with a chlorinating agent such as free chlorine or available chlorine in chlorine compounds, so as to produce germanium chloride, the latter being thereafter treated for recovery of germanium or germanium salts as desired by methods known in the art. This application is a continuation in part of my earlier application Serial No. 417,413, filed March 19, 1954.

One of the objects of my invention is to provide an improved process for recovering germanium from sulfide ores containing germanium compounds. Other objects of my invention will be apparent from the specification and claims which follow.

The reactions between metal sulfides and chlorine have long been known, and in fact proposals have been made to utilize these reactions as a means of decomposing the sulfide minerals to produce sulfur and metal chlorides. Since in such processes an essential step is the removal of sulfur formed in the reaction, the prior art processes have involved operations at temperatures above the distillation range of sulfur or under such lower temperature conditions as would nevertheless permit of volatilization of the sulfur substantially as quickly as it is formed. Such processes, however, have not been successful in practice.

I have found that by operating at a relatively low temperature, i.e. above the melting point but below the boiling point of sulfur under the prevailing conditions, I can achieve rapid and economical reaction of the mineral sulfides together with adequate removal of products and by-products from the surface of the sulfide particles, provided that I carry out the operation in the presence of a liquid, as more fully described below.

Among the sulfide-containing minerals which lend themselves to treatment by the novel process of my invention are sulfides of zinc, such as sphalerite and other zinc-containing ores, which frequently contain small amounts of germanium. It is the presence of germanium in relatively small amounts that makes difficult its recovery in any substantial proportion of the whole amount of the metal present by methods hitherto used for the extraction of germanium. However, that result is readily achieved by my invention. In such case the zinc is rendered available as zinc chloride, which may be recovered as such or may readily be converted to any other compound of the metal or may be reduced to the metal itself.

As a source of chlorine, I may use any chlorinating agent, such as free chlorine, sulfur chlorides, ferric chloride and the like.

My process may be carried out at temperatures in the range 150–440° C., and I prefer to operate between 300° C. and 400° C.

I can operate either at atmospheric or superatmospheric pressures. Although subatmospheric pressure operation is not precluded, I do not find that it has any advantages.

The operation of my process involves mainly the following reactions:

$$2ZnS+2Cl_2 \rightarrow ZnCl_2+S_2$$
$$GeS_2+2Cl_2 \rightarrow GeCl_4+S_2$$

from which it will be observed that zinc chloride, germanium tetrachloride and sulfur are formed. The operation can be carried out in the presence of other metal sulfides, in which case corresponding chlorides will be produced. The chlorides formed will naturally be produced at the surface of the sulfides which come in contact with the chlorinating agent. At temperatures in my range the sulfur will be present as a liquid and the zinc chloride preferably as a solid. Germanium tetrachloride boils at about 86° C. under the conditions of operation at atmospheric pressure and is removed from the reaction zone in vapor phase. In order to make sure that the germanium halide may be more effectively stripped from the mixture I prefer to pass a stream of nitrogen or other suitable gas over the surface of the reaction mixture. Such other suitable gases include sulfur dioxide, carbon dioxide and others which are relatively inert to the reactants under the reaction conditions.

I have found, as disclosed in application Serial No. 417,413 that, in order to make sure that the metallic sulfides will be effectively contacted by the chlorinating agent, the reaction should be carried out in the presence of liquids having the properties described below. I find that numerous inorganic and organic liquids are suitable for my purpose provided that they dissolve the chlorinating agent used, or chlorine liberated therefrom, preferably without reaction. However, a liquid medium that reacts with the chlorinating agent is satisfactory provided that excessive amounts of acids or other unwanted by-products are not formed and that the reaction is either readily reversible or yields a product which itself will chlorinate the metal sulfide.

Examples of organic compounds which are liquid under my reaction conditions and in which chlorine, for example, is soluble without reaction include known chlorinated or fluorinated hydrocarbons, which may be straight chain hydrocarbons, aromatics, diphenyls, naphthalenes and so on provided only that they are sufficiently halogenated so that they will not react further with chlorine under my reaction conditions. Among such compounds are octochloronaphthalene, decachlorodiphenyl, perfluoranthane, perfluorohexylamine, perfluoro lubricating oil, perfluoro kerosene, and the perfluoro fused ring compounds, such as perfluoroacenaphthane.

Examples of inorganic compounds which are reactive with chlorine and which may be used in my process are sulfur and the various sulfur chlorides.

Since the primary function of the added liquid in my process is to remove from the surface of the metal sulfides the sulfur and metal chlorides formed in the reaction, it is necessary that the liquid be present in large amounts relative to the sulfides. I have found that from about 2 to 10 times as much liquid by weight as metal sulfide is desirable. It is also essential that good agitation be provided so that the washing action of the liquid will be fully utilized.

When sulfur is used as such a liquid, some of the chlorine may react with the sulfur to form sulfur chlorides. However, this does not interfere with the overall operation of my process because sulfur chlorides in turn react with the metallic sulfides undergoing treatment.

In carrying out my invention, finely ground sphalerite or other zinc sulfide ore containing germanium, suitably dried by means known in the art, is introduced into a mass or stream of molten sulfur. The molten sulfur should be present in an amount from about 2 to about 10 times as much by weight as the metal sulfide undergoing treatment. I prefer to use about 5 times as much by weight of the liquid sulfur. Chlorine or other chlorinating agent is introduced and agitation achieved by any of the means known in the art. The amount of chlorinating agent used should be at least sufficient to convert substantially all of the germanium present in the reaction mixture to germanium tetrachloride. By maintaining a reaction temperature within the range set forth above the germanium tetrachloride is distilled from the reaction mixture and, with the aid of the nitrogen or other gas which is passed over the surface of the mixture undergoing reaction, the tetrachloride vapor is conveyed to a suitable condenser where it is liquefied. Alternatively, the germanium tetrachloride may be absorbed in water, preferably ice water, or in an alkaline solution to absorb or recover the germanium.

The zinc sulfide is converted into zinc chloride during the reaction and any other metal sulfides into the corresponding chlorides, and these are removed from the reaction zone as a suspension in the molten sulfur. I preferably recover the chlorides by treating the mixture with hot water under pressure at a temperature of 115–175° C., thereby leaching the chlorides out and thereafter separating the aqueous solution of the metal chlorides from the molten sulfur by means known in the art.

Alternatively, the sulfur-metallic chloride suspension can be cooled past the solidification point of the sulfur and thereafter pulverized and the pulverized mixture leached with water.

The following are examples of my process as carried out on a laboratory scale using sulfur as the liquid.

*Example I*

A quantity of zinc concentrates from a sulfide ore, the concentrates containing approximately 55% zinc, 30% sulfur, 3% iron and 0.03% germanium, together with some pyrite and galena, were treated with chlorine gas in the presence of an excess of sulfur at a temperature of 350° C. The surface of the sulfur was swept with a stream of nitrogen and the gases were cooled and scrubbed with sodium hydroxide. A recovery of 70% of the germanium content was obtained.

*Example II*

1 lb. of zinc concentrates containing about 55% zinc and about 0.04% germanium was introduced into 5 lbs. of molten sulfur and the mixture held at a temperature from 347° C. to 363° C. while 300 grams of chlorine gas were passed in over a period of 270 minutes, the mixture being stirred during the addition. A current of dry nitrogen was passed over the surface of the mixture throughout the reaction and was led into two absorbers in series, each containing a 10% solution of caustic soda. 98% of the zinc concentrate was decomposed to yield mainly sulfur and zinc chloride, together with chlorides of some other non-ferrous metals and of iron present in the original concentrate. The germanium was fully eliminated from the concentrates and about 60% of the germanium was recovered in the absorption bottles.

*Example III*

The same quantity of zinc concentrates was treated with the same amount of molten sulfur and chlorine but at a temperature range of 335–385° C. 300 grams of chlorine gas were passed in during the total treatment time of 125 minutes. A current of nitrogen was passed over the surface of the mixture and was led into two absorbers in series as in the first example. 98.1% of the zinc concentrate was decomposed and approximately 80% of the germanium was recovered in the absorption bottles.

What is claimed is:

1. A process of obtaining sulfur and germanium tetrachloride comprising treating germanium sulfide with chlorine at a temperature between 300 and 400° C. in the presence of liquid sulfur.

2. A process of obtaining sulfur and germanium tetrachloride comprising treating a metal sulfide concentrate containing germanium sulfide with a chlorinating agent at a temperature between 300 and 400° C. while said concentrate is suspended in liquid sulfur and distilling from the reaction mixture germanium tetrachloride thereby produced.

3. A process of decomposing metal sulfides comprising suspending a finely ground metal sulfide mixture containing germanium sulfide in from about 2 to about 10 times its volume of sulfur, maintaining said sulfur in the liquid phase at a temperature between 100 and 440° C., passing a chlorinating agent into the suspension thereby converting the germanium sulfide into sulfur and germanium tetrachloride, and separating said germanium tetrachloride from the reaction mixture by distillation of said chloride with the aid of an inert gas.

4. A process of decomposing germanium sulfide comprising suspending finely ground germanium sulfide in liquid sulfur, maintaining said suspension at a temperature between the melting and boiling points of sulfur, and passing into the suspension a chlorinating agent thereby converting the germanium sulfide into sulfur and germanium tetrachloride, and separating said germanium tetrachloride from the reaction mixture comprising liquid sulfur by distillation therefrom.

5. A process of decomposing germanium sulfide comprising suspending a concentrate containing the same in from about 2 to about 10 times its volume of sulfur, maintaining said sulfur in the liquid phase at a temperature between 100 and 440° C., passing into the suspension a chlorinating agent thereby converting the said sulfide into sulfur and germanium tetrachloride, and distilling germanium tetrachloride from the reaction mixture as it is produced.

References Cited in the file of this patent

UNITED STATES PATENTS

| | | |
|---|---|---|
| 1,904,484 | Levy | Apr. 18, 1933 |
| 1,928,406 | Bacon et al. | Sept. 26, 1933 |
| 2,499,836 | Reiber | Mar. 7, 1950 |

FOREIGN PATENTS

| | | |
|---|---|---|
| 1,000 | Australia | Aug. 6, 1931 |
| 378,017 | Great Britain | July 22, 1932 |

OTHER REFERENCES

"Metal Transactions," Journal of Metals (1949), vol. 185, pages 785–788.

Mellor: "Comprehensive Treatise on Inorganic and Theoretical Chemistry," vol. 7, page 257, 1927.